July 14, 1964
C. N. ARONSON
3,140,684
SPEED-SLOPE CONTROL FOR WELDING APPARATUS
Filed Feb. 25, 1963
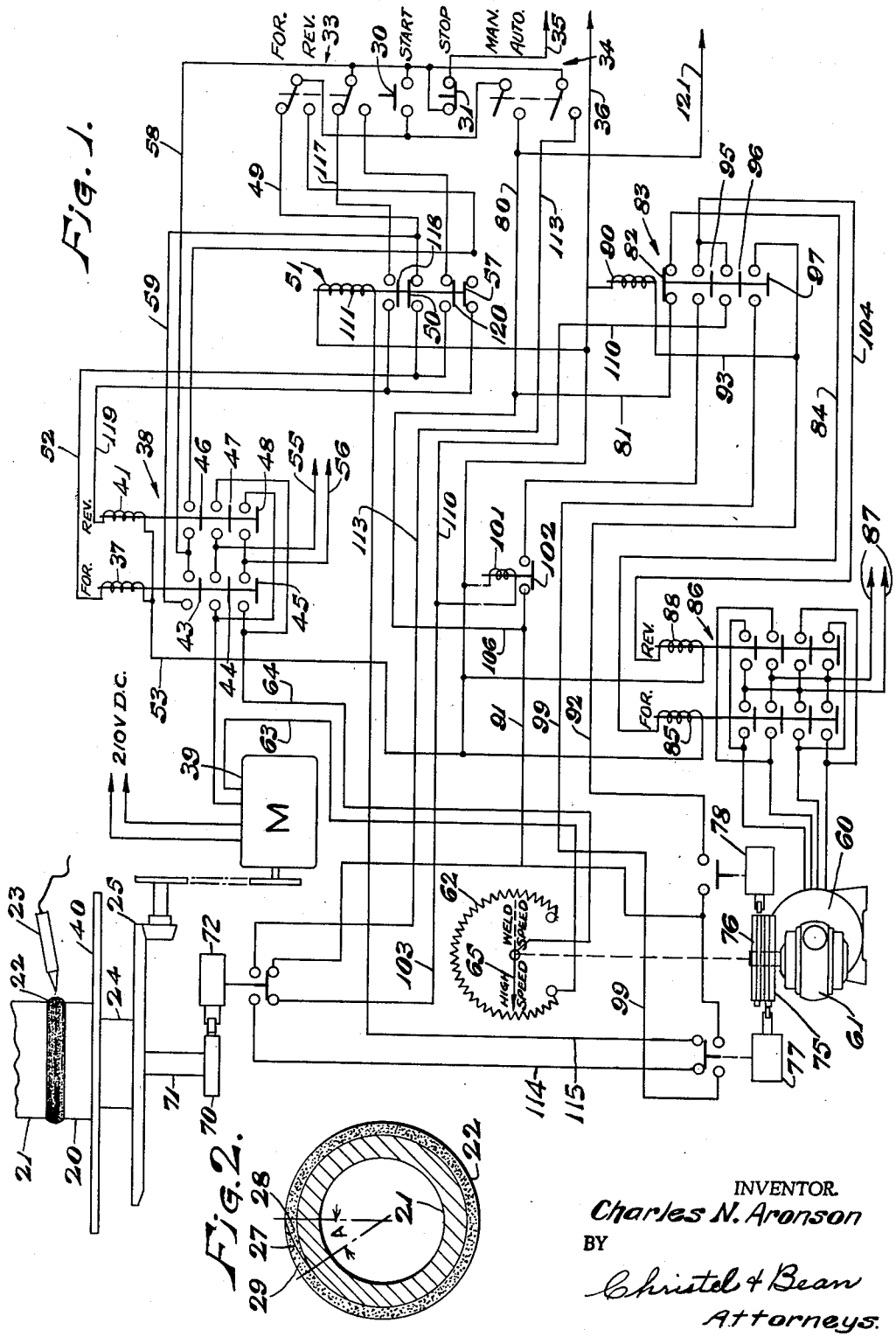
INVENTOR.
Charles N. Aronson
BY
Christel & Bean
Attorneys.

United States Patent Office 3,140,684
Patented July 14, 1964

3,140,684
SPEED-SLOPE CONTROL FOR WELDING
APPARATUS
Charles N. Aronson, Arcade, N.Y., assignor to Aronson
Machine Company, Inc., Arcade, N.Y.
Filed Feb. 25, 1963, Ser. No. 260,734
10 Claims. (Cl. 113—124)

This invention relates to welding apparatus and particularly to novel means for controlling the relative movement between a workpiece and weld metal depositing means to effect automatic variable regulation of the deposit of weld metal on the workpiece.

A common general type of welding operation, which term as used herein includes so-called hardfacing and overlaying, comprises depositing weld metal circumferentially about a circular workpiece or depositing weld metal along a circular joint between workpieces. A special problem exists in attempting to obtain a smooth and continuous deposit of weld metal at the circumferential point where the weld begins and ends. It is impossible to either start or stop a welding operation instantly and, even if it were, it would be difficult to have the starting and stopping points in exact abutment even if instantaneous starting and stopping of the weld could be achieved.

The least overrun causes a pile-up or hump and a slightly early stop causes a gap or depression in the weld. Accordingly a tapered overlap is necessary.

When an encircling weld on a shaft or other cylindrical workpiece reaches the starting point the weld at the starting point is cold. For this reason also a tapered overlap and blending of the overlapping weld metal along a substantial portion of the weld is required to provide a strong weld. Such overlapping can be practiced varying the deposit rate of the welder or by using a uniform welder deposit rate and varying the speed of the work relative to the welder but the former expedient is difficult to practice and does not produce uniform and controllable results.

Ideal welding of this type results when the starting and finishing slopes are exactly complementary. If they are not the overlap will be thicker or thinner in parts or in comparison with the main body of the encircling weld. In either case there will be harmful concentration of stress and a weld of poor appearance. Attempts to achieve a proper overlap by varying the rate of deposit of the welder have been unsatisfactory. The welder must be exactly controlled in relation to the welding positioner overtravel and at best a cut and try setup must be made. Making adjustments for different jobs is difficult; changing from one work diameter and travel rate to another means repeating the entire cut and try process.

It is accordingly much preferred to deposit weld metal at a constant rate per unit of time and obtain variations in the thickness of the weld deposit by speeding up or slowing down the movement of the work surface relative to the welding apparatus. Thus a theoretically perfectly controlled overlap may be obtained by starting the rotation of the workpiece at a high speed (to start with a minimum weld deposit), uniformly decelerate the rotation (to uniformly increase the weld deposit) until the full desired thickness is attained, then rotating the work at a constant rate until the 360° point is reached, then continuing rotation at a uniformly accelerating rate to produce an exactly complementary overlap until the overlap is exactly completed.

Since the work and its positioner or supporting table travel 360° plus the angular extent of the overlap it is desired that the positioner or supporting table rotate reversely at the conclusion of a welding operation to position the same to start a subsequent welding operation.

The apparatus of the present invention provides readily adjustable automatic means for producing the foregoing sequence of work holder or work positioner rotative movements. The arrangement is such that given a constant rate of metal deposit from the welding apparatus per se, simple adjustive manipulation enables the selection of a desired thickness of weld deposit and a desired angular length of sloping overlap. Only two adjustments are normally required to set up for a given job. The same adjustment for length of slope serves for both the increasing thickness portion at the beginning of a weld and the decreasing thickness portion at the conclusion of a weld and accordingly an operator is assured that the two portions will be exact replicas, in reverse, and that therefore a circumferential weld of entirely uniform thickness throughout, including the overlapping portion, will be produced.

A single specific embodiment of apparatus for effecting the purposes of the present invention is illustrated schematically in the drawing and is described in detail in the following specification. It is to be understood that such embodiment is merely by way of example and that numerous variations may be effected without departing from the spirit or scope of the invention as defined in the appended claims.

In the drawing:

FIG. 1 is a schematic view showing a wiring diagram of one form of the welding control apparatus of the present invention with a welding positioner table, a workpiece and welding apparatus shown schematically in conjunction therewith; and FIG. 2 is a top plan view of the workpiece of FIG. 1.

In FIG. 1 a welding positioner in the form of a rotatable table 40 is shown with workpieces positioned coaxially thereon. Merely by way of example, the welding job may comprise a pair of cylinders 20 and 21 which are to be butt welded by an encircling weld 22 which overlies the juncture of the cylinders 20 and 21. Welding apparatus for depositing weld material at a constant rate is indicated schematically at 23 and may take various forms.

In FIG. 1 the table 40 is mounted for rotation in a bearing 24 and is rotated by a gear and pinion drive 25 which is driven from a direct current, reversible electric motor 39.

FIG. 2 indicates the overlapping portions of weld 22, the line 27 indicating the juncture of interface between the portion 28 of weld 22 which is applied during the initial period when the speed of table 40 is being reduced to gradually increase the thickness of the deposit and the portion 29 indicating the weld material which is deposited during the final portion when the speed of table 40 is being increased. The angle A indicates the angular extent of the overlapping portions 27 and 28 of weld 22.

Referring to the wiring diagram, reference will first be had to the circuitry normally employed in rotating the welding table at a predetermined constant speed without reference to the use of the novel slope control arrangement of the present invention. The switches which are manipulated by the operator of the machine are shown at the extreme right of the wiring diagram and comprise a normally open start switch 30, a normally closed stop switch 31, a double pole, double throw forward and reverse selector switch 33, and a double pole, single throw selector switch 34 for either manual or automatic operation. Conductors 35 and 36 supply energy for the control circuitry.

When the automatic slope control of the present invention is not being employed, selector switch 34 is open as shown. With switch 33 in forward position, momentary closure of start switch 30 energizes the forward winding 37 of a magnetic reversing starter switch 38 for controlling the direction of the adjustable speed D.C. motor 39 which drives welding positioner table 40. The reverse winding of start switch 38 is designated 41. Forward winding 37 closes three normally open switches 43, 44 and 45, the corresponding switches of reverse winding 41 being designated 46, 47 and 48.

The initiating circuit for winding 37 is from line 35, through stop switch 31, through start switch 30 through the upper pole of selector switch 33, conductor 49, a normally closed switch 50 of a relay 51 and by way of a conductor 52 to winding 37, thence by way of a return conductor 53 to the line 36.

The switches 44 and 45 connect power supply conductors 55 and 56 to motor 39. Closure of switch 43 establishes a holding circuit for winding 37 from supply conductor 35, through stop switch 31, a conductor 58 to switch 43, and a return conductor 59 which leads through the aforesaid normally closed switch 50 of a relay 51 and thence through conductor 52, winding 37 and return conductor 53.

Pressing the control button of stop switch 31 momentarily opens the same which breaks the holding circuit, deenergizes winding 37, and stops the motor 39 which drives welding positioner table 40. The operation through the reverse winding 41 by positioning selector switch 33 in the reverse position rotates table 40 in the opposite direction in a like manner to that just described for forward operation. In the reverse position of selector switch 33 normally closed contacts 57 of relay 51 take the place of the contacts 50 in the initiating and holding circuits.

Reference will now be had to the operation of the present apparatus in accordance with the present invention whereby the speed of positioner table 40 is varied to vary the thickness of the weld deposit in the manner and for the purposes described in the preamble hereto. Generally speaking, the remainder of the circuitry is provided for automatically varying and regulating the speed of motor 39 to vary the speed of table 40. Since the welding apparatus deposits weld metal at a constant rate, such regulation of the speed of table 40 regulates and varies the thickness of the weld deposit.

In the wiring diagram the numeral 60 designates a constant speed motor which drives a variable ratio transmission and reducer unit 61. The output shaft of variable transmission 61 drives a single turn potentiometer or rheostat 62 which is connected in the direction control circuit to table motor 39 by conductors 63 and 64.

It will be noted that the rotating arm 65 of rheostat 62, which is rotated by transmission 61, normally moves between the full line "high speed" position and the dotted line "weld speed" position. Manual adjustment of the ratio of transmission 61 determines the speed at which arm 65 moves from "high speed" to "weld speed" position and vice versa and thus determines the magnitude of angle A, that is, the arcuate extent of the overlap.

At the high speed setting a minimum thickness of weld metal is deposited due to relatively rapid rotation of table 40 and at weld speed the maximum thickness is deposited since the table 40 is then rotating at its lowest speed. The degree of angular travel of table 40 in passing from high speed setting to weld speed setting determines the angular space within which the weld thickness increases from zero to maximum at the beginning of a weld and decreases from maximum to zero at the end of a weld.

These increases and decreases are regular and gradual and are caused to exactly overlap by the apparatus of the present invention so that the overlapping portions are the same total thickness as the main body of the weld and thus the entire encircling weld is of uniform thickness. As noted above the angular distance of overlap is determined by the adjusted speed setting of variable transmission 61.

A cam 70 fixed to the spindle 71 of table 40 for rotation therewith has a single rise or projection for actuating a limit switch 72. Cam 70 is adjustable on spindle 71 and is positioned so that its rise or projection actuates the limit switch at a point coinciding with the beginning of a weld operation, that is, the beginning of the minimum deposit portion of the weld. This also coincides with the beginning of the decreasing portion of the weld which begins 360° after the beginning of the increasing portion. Limit switch 72 is of the double throw type and is shown in the position it occupies at such 0° and 360° points; at all other points the switch is in a reversed position, that is, an upper position as shown in the wiring diagram.

A pair of cams 75 and 76 are adjustably fixed to the output shaft of variable transmission 61 and, like the cam 70, have single loves or projections for operating limit switches designated 77, and 78, respectively. At the beginning position shown in the wiring diagram the projection of cam 75 is in engagement with limit switch 77 and the cam 76 is set so that its projection will engage limit switch 78 at the end of the increase portion of the weld when it is desired that welding continue at maximum thickness until the decrease portion is reached, 360° from the starting point.

To begin an automatic welding sequence in accordance with the present invention the selector switch 34 is manually moved to closed (automatic) position and start switch 30 is momentarily closed. Closure of start switch 30 energizes the forward winding 37 as in the case of manual operation of the table 40 and in addition connects power from line 35 through stop switch 31, through start switch 30, through the upper pole of selector switch 34, to conductor 80, conductor 81, a normally closed switch 82 of a relay 83, through conductor 84 to a forward winding 85 of a conventional magnetic reversing starter unit 86 which controls motor 60. Energization of winding 85 closes the four associated switches thereof to connect the four leads of motor 60 to a power supply 87 in a well known manner. In reverse operation a reverse winding 88 is energized to close its four associate switches and motor 60 operates in a reverse direction.

The momentary closure of start switch 30 also energizes the table motor 39 in a forward direction in the same manner as in the conventional manual operation previously described, its operation being maintained by the same holding circuit through conductors 58 and 59 and switch 43, the winding 37 comprising the holding coil. Since arm 65 of rheostat 62 is in its minimum resistance high speed position motor 39 begins operation at a maximum speed whereby a minimum weld deposit is laid onto the work.

During the period when the weld deposit thickness is increasing from zero to a maximum motor 60 continues in operation to move the arm 65 of rheostat 62 at a constant speed in accordance with the selected setting of variable transmission 61 from "high speed" to "weld speed" position, thus gradually increasing the resistance in the energizing circuit of table motor 39 and thus gradually slowing the same.

During this phase the power to motor 60 is maintained by the same basic holding circuit that maintains operation of table motor 39. That is, through stop button 31, conductor 58, switch 43 and conductor 59. The holding circuit for motor 60 then goes by way of conductor 49, the top forward contact of selector switch 33, through the top automatic contact of switch 34, conductors 80 and 81, switch 82, conductor 84, winding 85 and back to line 36.

At the first movement of the variable transmission drive motor 60 and table motor 39 the limit switches 72 and 77 reverse from their illustrated positions, the cams being set so that limit switch 77 slightly precedes limit switch 72 in operation. This closes the lower contacts of limit switch 77 and sets up a holding circuit for relay 83 which is completed when the end of the rheostat arm reaches weld speed at which time the cam 76 is set to actuate limit switch 78 and close the contacts thereof.

Upon closure of the contacts of limit switch 78 the winding 90 of relay 83 is energized by way of conductor 80, a conductor 106, a conductor 91, limit switch 78 and conductors 92 and 93. This opens switch 82 of relay 83 and closes switches 95, 96 and 97 thereof. The opening of switch 82 deenergizes motor 60 and therefore welding proceeds at a constant rate of deposit with the rheostat arm 65 at the weld speed position. The relay 83 is maintained energized during the constant weld speed period by limit switch 78 and during the decrease period of the weld by a circuit from conductor 91, through the bottom contacts of limit switch 77, a conductor 99, switch 97 and conductor 93 to winding 90.

The maximum deposit portion of the welding operation ends when table 40 has rotated 360° at which point the beginning of the increase portion 28 of the weld is again reached and decrease begins. At this point the lower contacts of limit switch 72 are again closed as illustrated which energizes a relay winding 101 and closes its switch 102 by way of a conductor 103. This establishes a reverse circuit for motor 60 from conductor 80, through conductor 106, switch 102, switch 95 of relay 83, and by way of a conductor 104 to reverse winding 88 of magnetic starter switch 86.

Since the lower contacts of limit switch 72 are energized only momentarily at the 360° point, a holding circuit is provided for relay winding 101, as follows. The closure of switch 102 sets up a holding circuit for winding 101 which extends from conductor 80, through conductor 106, switch 102, switch 95, back through switch 96, through a conductor 110 and thence through winding 101 to the return line 36. This maintains the previously described energizing circuit for reverse winding 88 of the magnetic starter switch 86 during the weld decrease period during which the arm of rheostat 62 is being returned to high speed position by reverse operation of motor 60 and table 40 is being accelerated to gradually reduce the thickness of the weld deposit.

When the weld decrease portion of the operation ends, that is when the arm of rheostat 62 reaches the high speed position of the wiring diagram, the lobe of cam 75 again actuates limit switch 77 to reverse the same and open the bottom contacts thereof and close the top contacts. Opening such bottom contacts breaks the holding circuit of winding 90 of relay 83 and accordingly motor 60 is deenergized. At this point the top contacts of limit switch 72 are closed and the bottom contacts are open.

Means are provided for rotating table 40 backwardly so that its total net forward movement is 360° for a complete cycle of operation and thus cam 70 is positioned with its lobe or projection in engagement with limit switch 72 preparatory to beginning a subsequent cycle of automatic operation. Relay 51 which has been referred to previously herein is provided for effecting this backing up phase of the cycle of operation.

At the end of the forward rotation of table 40 the top contacts of limit switch 72 and the top contacts of limit switch 77 energize winding 111 of relay 51, the circuit being from the lower contact of selector switch 34, by way of a conductor 113, through the top contacts of limit switch 72, through a conductor 114, the top contacts of limit switch 77, a conductor 115, winding 111, thence to return line 36.

This opens switch 50 of relay 51 to deenergize the forward winding 37 of magnetic starter 38 and energizes the reverse winding 41 through the lower forward contact of selector switch 33, a conductor 117, upper switch 118 of relay 51, and thence to reverse winding 41 by way of a conductor 119. Table 40 then rotates reversely until limit switch 72 is actuated by the lobe of cam 70 whereupon the top contacts of limit switch 72 open, winding 111 is deenergized, switch 118 opens, and winding 41 is deenergized to stop motor 39. In a welding operation which proceeds reversely the backing up phase is of course effected through the forward winding 37 and in such case a switch 120 of relay 51 takes the place of switch 118.

In the wiring diagram the numeral 121 designates a conductor which is connected to the automatic selector switch contact and which is activated when the start button 30 is operated to begin an automatic cycle of operation. Conductor 121 activates the welding apparatus which is indicated schematically at 23 in FIG. 1.

I claim:

1. Welding apparatus comprising a rotatable work holder, variable speed drive means for rotating the same, and automatic means for varying the speed of said drive means to vary the thickness of weld metal deposited circumferentially on a work piece rotating coaxially with said holder, said automatic means comprising a controller movable to vary the speed of said drive means, reversible power means for moving said controller in opposite directions, first means operative upon initial movement of said work holder for actuating said power means to move said controller in a direction to decrease the speed of said drive means, second means operable upon predetermined movement of said controller to stop said power means whereby said drive means continues operation at a constant speed, said first means being operative upon 360° of work holder rotation to actuate said power means in a reverse direction to move said controller in a speed-increasing direction, and means operative when said controller reaches initial position for again stopping said power means.

2. Welding apparatus comprising a rotatable work holder, reversible variable speed drive means for rotating the same, and automatic means for varying the speed of drive means to vary the thickness of weld metal deposited circumferentially on a work piece rotating coaxially with said holder, said automatic means comprising a controller movable to vary the speed of said drive means, reversible power means for moving said controller in opposite directions, first means operative upon initial movement of said work holder for actuating said power means to move said controller in a direction to decrease the speed of said drive means, second means operable upon predetermined movement of said controller to stop said power means whereby said drive means continues operation at a constant speed, said first means being operative upon 360° of work holder rotation to actuate said power means in a reverse direction to move said controller in a speed-increasing direction, means operative when said controller reaches initial position for again stopping said power means and for operating said drive means reversely, said first means being operative when said work holder reaches initial position to stop said drive means.

3. Welding apparatus comprising a rotatable work holder, variable speed drive means for rotating the same, and automatic means for varying the speed of said drive means to vary the thickness of weld metal deposited circumferentially on a work piece rotating coaxially with said holder, said automatic means comprising a controller movable to vary the speed of said drive means, reversible power means for moving said controller in opposite directions, means for selectively adjusting the speed setting of power means, first means operative upon initial movement of said work holder for actuating said power means to move said controller in a direction to decrease the speed of said drive means, second means operable upon predetermined movement of said controller to stop said power means whereby said drive means continues operation at a constant speed, said first means being operative upon 360° of work holder rotation to actuate said power means in a reverse direction to move said controller in a speed-increasing direction, and means operative when said controller reaches initial position for again stopping said power means.

4. Welding apparatus comprising a rotatable work holder, reversible variable speed drive means for rotating the same, and automatic means for varying the speed of drive means to vary the thickness of weld metal deposited circumferentially on a work piece rotating coaxially with said holder, said automatic means comprising a controller movable to vary the speed of said drive means, reversible power means for moving said controller in opposite directions, means for selectively adjusting the speed setting of said power means, first means operative upon initial movement of said work holder for actuating said power means to move said controller in a direction to decrease the speed of said drive means, second means operable upon predetermined movement of said controller to stop said power means whereby said drive means continues operation at a constant speed, said first means being operative upon 360° of work holder rotation to actuate said power means in a reverse direction to move said controller in a speed-increasing direction, means operative when said controller reaches initial position for again stopping said power means and for operating said drive means reversely, said first means being operative when said work holder reaches initial position to stop said drive means.

5. Welding apparatus comprising a rotatable work holder, a variable speed electric motor for rotating the same, and automatic means for varying the speed of said motor to vary the thickness of weld metal deposited circumferentially on a work piece rotating coaxially with said work holder, said automatic means comprising a controller movable to vary the speed of said motor, reversible motor means for rotating said controller in opposite directions, a selectively variable-ratio transmission between said controller rotating motor means and said controller, first means operative upon initial movement of said work holder for actuating said controller motor means to move said controller in a direction to decrease the speed of said variable speed work holder motor, second means operable upon predetermined movement of said controller to stop said controller motor means whereby said work holder motor continues operation at a constant speed, said first means being operative upon 360° of work holder rotation to actuate said controller motor means in a reverse direction to move said controller in a speed-increasing direction, and means operative when said controller reaches initial position for again stopping said controller motor means.

6. Welding apparatus comprising a rotatable work holder, a variable speed drive means for rotating the same, and automatic means for varying the speed of said drive means to vary the thickness of weld metal deposited circumferentially on a work piece rotating coaxially with said work holder, said automatic means comprising a controller movable to vary the speed of said drive means, reversible motor means for rotating said controller in opposite directions, a selectively variable-ratio transmission between said controller moving means and said controller, first means operative upon initial movement of said work holder for actuating said motor means to move said controller in a direction to decrease the speed of said drive means, second means operable upon predetermined movement of said controller to stop said motor means whereby said drive means continues operation at a constant speed, said first means being operative upon 360° of work holder rotation to actuate said motor means in a reverse direction to move said controller in a speed-increasing direction, and means operative when said controller reaches initial position for again stopping said motor means.

7. Welding apparatus comprising a rotatable work holder, a variable speed drive means for rotating said work holder, and automatic means for varying the speed of said work holder drive means to vary the thickness of weld metal deposited circumferentially on a work piece rotating coaxially with said holder, said automatic means comprising a controller movable to vary the speed of said drive means, reversible power means for moving said controller in opposite directions, adjustable sequence means operating in timed relation with said work holder and said controller for first actuating said power means to move said controller in a direction to decrease the speed of said drive means for a pre-adjusted angle of rotation of said work holder, then stopping said power means for the balance of a full rotation of said work holder, then actuating said power means in a reverse direction during an angle of rotation of said work holder equal to said pre-adjusted angle to move said controller to initial position.

8. Welding apparatus comprising a rotatable work holder, a variable speed electric motor for rotating the same, and automatic means for varying the speed of said motor to vary the thickness of weld metal deposited circumferentially on a work piece rotating coaxially with said holder, said automatic means comprising a controller movable to vary the speed of said motor, reversible power means for moving said controller in opposite directions, adjustable sequence means operating in timed relation with said work holder and said controller for first actuating said power means to move said controller in a direction to decrease the speed of said motor for a pre-adjusted angle of rotation of said work holder, then stopping said power means for the balance of a full rotation of said work holder, then actuating said power means in a reverse direction during an angle of rotation of said work holder equal to said pre-adjusted angle to move said controller to initial position, and means for reversing said electric motor to rotate said work holder reversely until it reaches initial position.

9. Welding apparatus comprising a rotatable work holder, a variable speed drive means for rotating said work holder, and automatic means for varying the speed of said work holder drive means to vary the thickness of weld metal deposited circumferentially on a work piece rotating coaxially with said holder, said automatic means comprising a controller movably to vary the speed of said drive means, reversible power means for moving said controller in opposite directions, adjustable sequence means operating in timed relation with said work holder and said controller for first actuating said power means to move said controller in a direction to decrease the speed of said drive means for a pre-adjusted angle of rotation of said work holder, then stopping said power means for the balance of a full rotation of said work holder, then actuating said power means in a reverse direction during an angle of rotation of said work holder equal to said pre-adjusted angle to move said controller to initial position, and means for reversing said drive means to restore said work holder to its initial position.

10. Welding apparatus comprising a rotatable work holder, a variable speed drive means for rotating the same, and automatic means for varying the speed of said drive means to vary the thickness of weld metal deposited circumferentially on a work piece rotating coaxially with said holder, said automatic means comprising a controller movable to vary the speed of said drive means, reversible power means for moving said controller in opposite directions, means operable upon initial movement of said work holder to operate said power means in a direction to decelerate said drive means, means operable upon predetermined movement of said work holder to interrupt said power means to maintain constant work holder speed, and means operable upon a full rotation of said work holder for actuating said power means reversely to accelerate said work holder for a period equal to the movement thereof during the decelerating portion of its operation.

No references cited.